(12) United States Patent
Roman et al.

(10) Patent No.: US 7,953,876 B1
(45) Date of Patent: May 31, 2011

(54) VIRTUAL INTERFACE OVER A TRANSPORT PROTOCOL

(75) Inventors: Harold E. Roman, Acton, MA (US); James B. Williams, Lowell, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1352 days.

(21) Appl. No.: 10/651,426

(22) Filed: Aug. 28, 2003

Related U.S. Application Data

(60) Provisional application No. 60/421,310, filed on Oct. 24, 2002.

(51) Int. Cl.
 *G06F 15/16* (2006.01)
(52) U.S. Cl. ........ 709/230; 709/227; 709/228; 709/250; 370/463; 700/100
(58) Field of Classification Search .................. 709/245, 709/227, 228, 250; 370/463
See application file for complete search history.

(56) References Cited

U.S. PATENT DOCUMENTS

| | | | | |
|---|---|---|---|---|
| 5,699,361 | A * | 12/1997 | Ding et al. | 370/431 |
| 5,890,002 | A * | 3/1999 | Li et al. | 710/260 |
| 5,903,735 | A * | 5/1999 | Kidder et al. | 709/240 |
| 6,173,374 | B1 | 1/2001 | Heil et al. | 711/148 |
| 6,347,337 | B1 * | 2/2002 | Shah et al. | 709/224 |
| 6,434,620 | B1 * | 8/2002 | Boucher et al. | 709/230 |
| 6,470,397 | B1 * | 10/2002 | Shah et al. | 709/250 |
| 6,504,819 | B2 * | 1/2003 | Fowler et al. | 370/230 |
| 6,529,945 | B1 * | 3/2003 | Calhoun et al. | 709/213 |
| 6,854,015 | B2 * | 2/2005 | McCormack et al. | 709/227 |
| 6,938,092 | B2 * | 8/2005 | Burns | 709/230 |
| 7,042,877 | B2 * | 5/2006 | Foster et al. | 370/389 |
| 7,124,198 | B2 * | 10/2006 | Pinkerton | 709/236 |
| 7,181,541 | B1 * | 2/2007 | Burton et al. | 709/250 |
| 7,376,755 | B2 * | 5/2008 | Pandya | 709/250 |
| 2002/0062402 | A1 * | 5/2002 | Regnier et al. | 709/313 |
| 2002/0083224 | A1 * | 6/2002 | Langerman et al. | 710/3 |
| 2002/0172348 | A1 * | 11/2002 | Cheung et al. | 379/242 |
| 2002/0184446 | A1 * | 12/2002 | Kagan et al. | 711/130 |
| 2003/0182389 | A1 * | 9/2003 | Edwards | 709/213 |
| 2009/0254647 | A1 * | 10/2009 | Elzur et al. | 709/223 |

OTHER PUBLICATIONS

Technology Brief Virtual Interface Architecture for system Area networks Compaq Computer System Prepared by ISSD Technology Communications, 1999.*
A common interface host bus adapter Storage networking Industry Association Fibre Channel Working Group Jan. 28, 2001. Editor: Mark Woithe, JNI Corp.*
VIDF Virtual Interface (VI) Architecture Developers Guide Revision 1.1 Draft Intel Corporation Sep. 26, 2000.*
"Virtual Interface Architecture Specification," Version 1.0, Dec. 16, 1997, © 1997 Compaq Computer Corp., Intel Corporation, Microsoft Corporation; p. 1.
Technology Brief, Virtual Interface Architecture for System Area Networks, Fourth Edition (Jun. 1999) 0184.
"VI/TCP (Internet VI)," Network Working Group, Internet.

* cited by examiner

*Primary Examiner* — Dohm Chankong
*Assistant Examiner* — Tauqir Hussain
(74) *Attorney, Agent, or Firm* — Morrison & Foerster LLP

(57) ABSTRACT

A method and system comprising a host system and a host bus adapter (HBA). The HBA is configured to handle a Virtual Interface and Transmission Control Protocol (TCP)/Internet Protocol (IP) processing for applications running on the host system.

24 Claims, 9 Drawing Sheets

VIRTUAL INTERFACE OVER A TRANSPORT PROTOCOL

CLAIM OF PRIORITY

The present application claims priority to co-assigned U.S. Provisional Patent Application No. 60/421,310 filed on Oct. 24, 2002, which is hereby incorporated by reference.

BACKGROUND

The present application may refer to the following documents: "Virtual Interface Architecture Specification," Version 1.0, Dec. 16, 1997 from Compaq, Intel and Microsoft (hereinafter "VIAR"); "Intel Virtual Interface (VI) Architecture Developer's Guide," September, 1998 from Intel (hereinafter "VIDG"); "VIDF Virtual Interface (VI) Architecture Developer's Guide," Revision 1.1 Draft, Sep. 26, 2000 from Intel; and a "VI/TCP (Internet VI)" memo published by Jim Williams, a named inventor of the present application, and S. DiCecco, for the Network Working Group of the Internet Engineering Task Force (IETF), on Jul. 14, 2000 (hereinafter "IETF Memo").

Transmission Control Protocol (TCP)/Internet Protocol (IP) is a set of networking protocols that provide communication across interconnected networks, between computers with diverse hardware architectures and various operating systems. The TCP/IP protocols track Internet addresses of nodes, routes outgoing messages and recognizes incoming messages. TCP is a connection-oriented, end-to-end transport layer protocol used to transfer data in a network. IP addresses packets and is the messenger protocol of the TCP/IP protocols.

A conventional network interface card (NIC) receives TCP/IP packets from a network and stores the packets in a NIC memory. The conventional host system copies packets from the NIC memory to a host memory and handles transport protocol processing of the TCP/IP packets. A kernel of a conventional host operating system (OS) may execute a TCP/IP stack. The host OS typically provides a set of commands that may configure the host TCP/IP stack and a network interface.

The host software may use TCP and IP headers to determine a "connection" associated with each packet. An IP header may include a source IP address and a destination IP address. A TCP header may include a source port ID/number, a destination port ID/number, a checksum, a packet sequence number and other control information. If the TCP/IP packets are received from the network out of order, the host software may use TCP packet sequence numbers in TCP headers to put the TCP/IP packets in a proper order. The host software may also reassemble data (messages) that the NIC receives in pieces.

Popular legacy communication libraries and technologies, such as sockets on TCP/IP Ethernet, rely on the host processor to process communication protocols. As networks become faster, computer systems spend more time running communication protocols, which leaves less time for application processing. As the host processor becomes over-taxed by the communications protocol overhead, the network is underutilized. While processors and networks become faster, the overhead of protocol processing leaves the processor with little time to execute applications, and the network potential remains unrealized.

SUMMARY

The Virtual Interface (VI) architecture (VIAR) was designed to interface distributed applications to accelerated protocol processing. VI seeks to improve the performance of such applications by reducing latency and processing overheads associated with communication protocol stack processing of traditional network architectures. VI may provide applications with a protected, directly accessible interface to network hardware. VI may simulate a network adapter to a software application, so that the application acts as if it has its own hardware network adapter, i.e., communicates directly with hardware.

The new VI communication technology has been implemented on non-standard network technologies, such as C-Lan, a wire protocol. VI built on non-standard or unpopular technologies fail to realize the benefits of existing networking infrastructures. VI was not originally intended for TCP/IP.

A VI/TCP connection establishment process may use an underlying TCP connection to exchange VI/TCP protocol messages. VI connections may have a one-to-one correspondence with TCP connections, i.e., each VI connection is associated with a TCP connection. A VI "Provider" may include a network interface card (NIC) handling VI/TCP connections. The VI Provider first requests TCP to establish a connection. After the underlying TCP connection is accepted and established, the VI Provider may perform VI/TCP protocol messaging over the underlying TCP connection.

A VI "Consumer" application invokes VI/TCP functions through an application program interface (API), which may be the API defined in the "Virtual Interface (VI) Architecture Developer's Guide." The VI Provider supports these VI/TCP functions with the VI Protocol. The VI Protocol defines "messages" to implement these VI functions (e.g., connections establishment). Typically, there is one message per Transmit Descriptor. Each message has a type (e.g., a Remote Direct Access Memory (RDMA) Write). VI messages may be divided into "segments." These segments are sent in order over the associated TCP connection.

The present application describes hardware and firmware at endpoints of a network, as well as specific queues, such as command queues and doorbell queues.

The present application relates to host memory structures, HBA hardware, software, firmware, special Virtual Interface Provider Library (VIPL) application libraries, memory structures and device drivers that implement a VI with a TCP/IP Ethernet network to transport control and application data between multiple host computer systems. The VI Architecture (VIAR) defines a "top" layer of a network interface, and the IETF Memo defines a wire or "bottom" layer. The present application relates to HBA hardware, software and firmware between the top and bottom layers.

The methods described herein may provide efficient high speed VI message passing services and Remote Direct Memory Access (RDMA) services to applications running on computer systems across standard network technology. The system may have a number of advantages, such as reducing host overhead and improving host and HBA performance. The host operating system and host applications can avoid or reduce the overhead of handling TCP/IP protocol processing, which is handled by an HBA.

An aspect of the application relates to a system comprising a host system and a host bus adapter.

The details of one or more embodiments are set forth in the accompanying drawings and the description below. Other features and advantages will be apparent from the description and drawings, and from the claims.

DETAILED DESCRIPTION

Figure 1A:
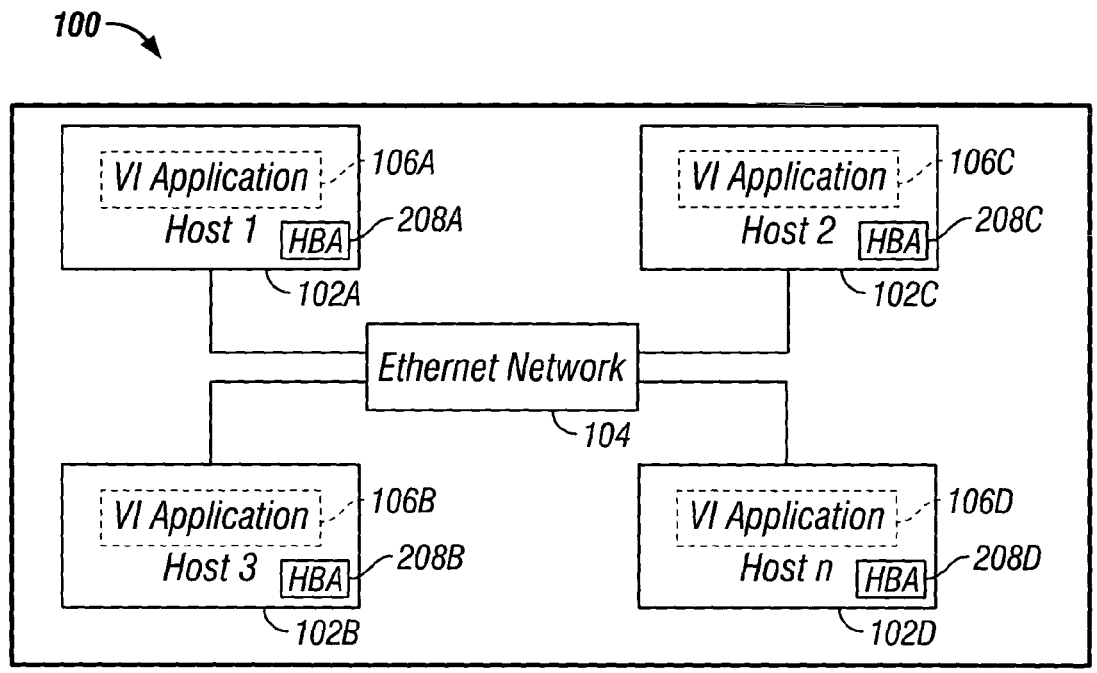
FIG. 1A illustrates a plurality of host systems coupled to a network.

FIG. 1A illustrates a plurality of host systems 102A-102D coupled to a network 104. The network 104 may be an Ethernet network using Transmission Control Protocol (TCP)/Internet Protocol (IP) packets. Although four host systems 102A-102D are shown in FIG. 1, any number of host systems may be implemented.

Figure 1B:
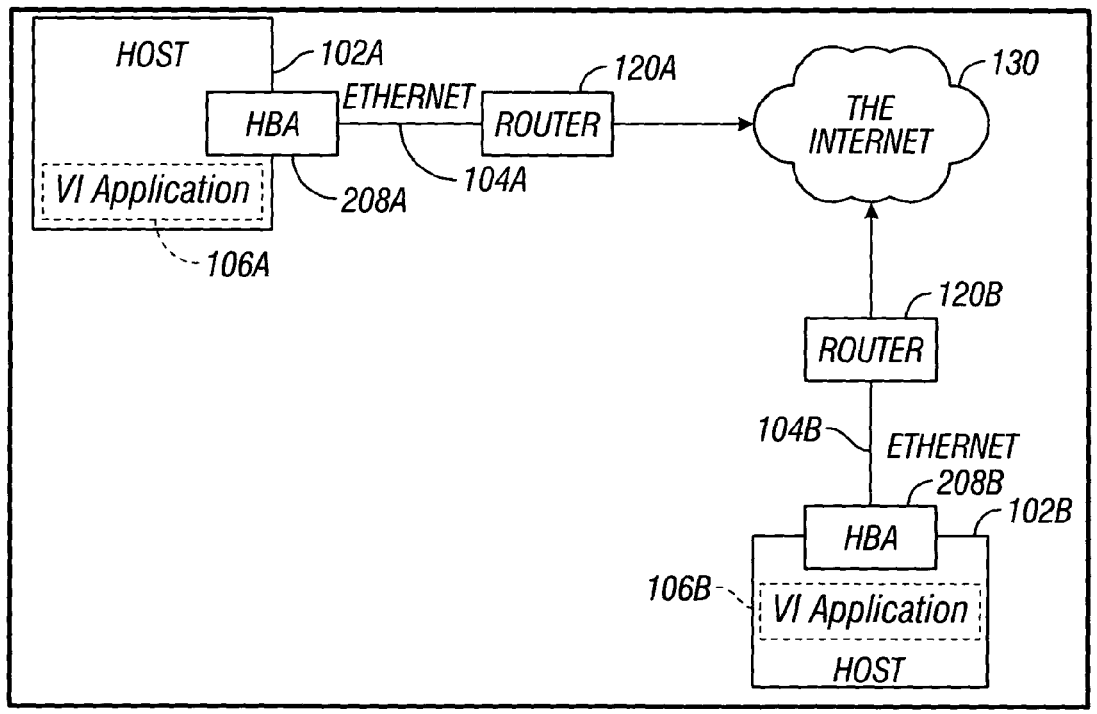
FIG. 1B illustrates a variation of the network in FIG. 1A, which includes Ethernet network segments, routers and an Internet network.

FIG. 1B illustrates a variation of the network 104 in FIG. 1A, which includes Ethernet network segments 104A, 104B, routers 120A, 120B and an Internet network 130. The networks in FIG. 1A and FIG. 1B may also have switches.

Figure 2:
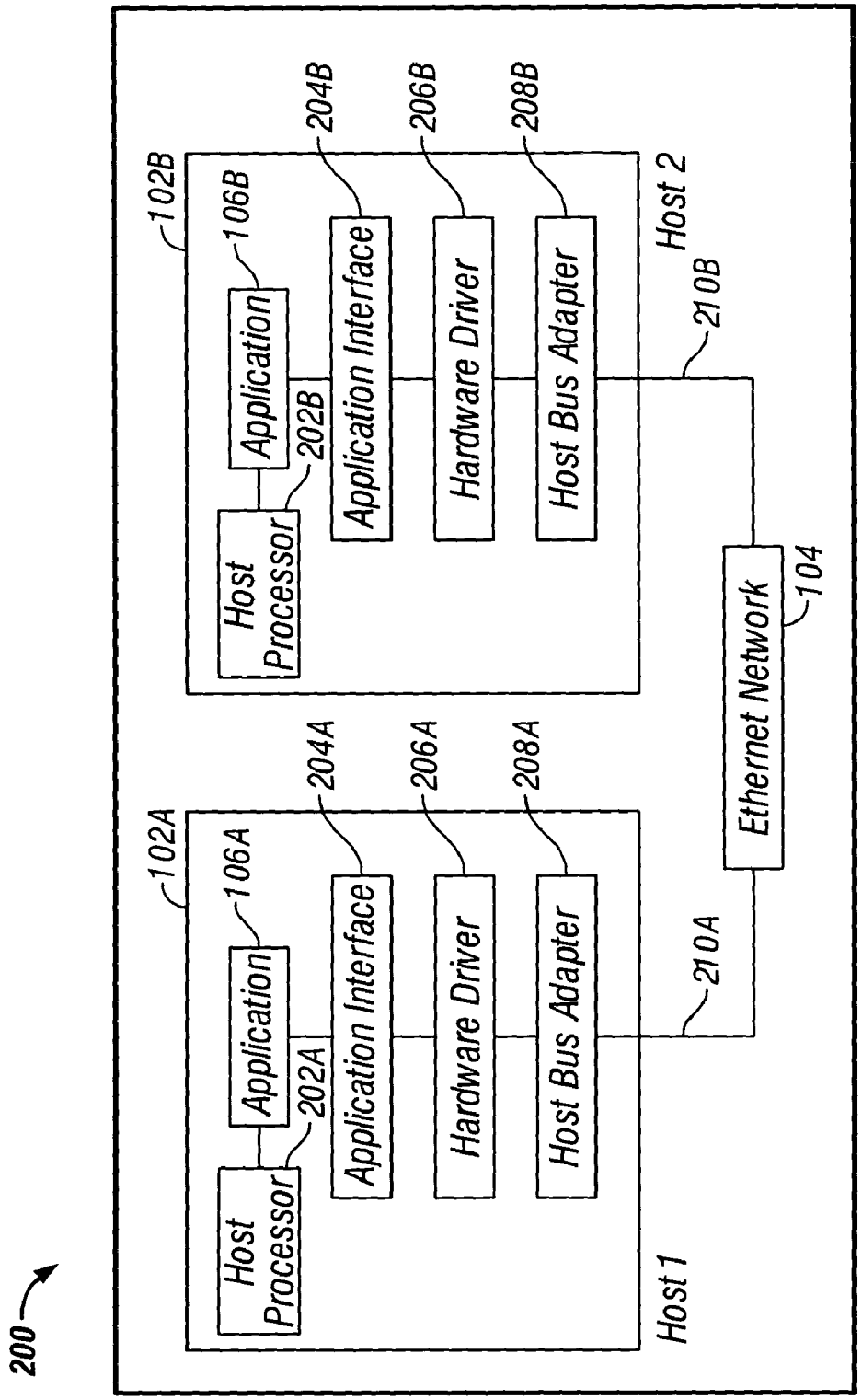
FIG. 2 illustrates components of two host systems coupled to a network.

Each host system 102 in FIG. 1A may be a server computer, a network attached storage (NAS) unit, a network storage unit or any device capable of executing an application 106 that transfers and/or receives data across the network 104. Each host system 102 includes a processor, memory and at least one software application 106 that uses a Virtual Interface (VI) provided by a host bus adapter 208 (FIG. 2). Each host system 102 may have several applications 106 running simultaneously.

The VI application 106 may be referred to as a user application, a client or a server. A "Virtual Interface" (described further below) allows each VI application 106 to transfer data to another VI application 106 across the network 104 as if each VI application 106 has its own hardware network adapter, i.e., communicates directly with hardware, which communicates with another application via the network 104. Communications between two applications A 106A and B 106B would not affect communications between other applications A 106A and C 106C, even if the applications 106A-106C are using the same hardware, e.g., network 104. For example, if one application 102C crashes, the other applications 106A, 106B and their communications are protected by the HBAs 208A, 208B in FIG. 2.

FIG. 2 illustrates components of two host systems 102A-102B coupled to a network 104. Each host system 102 includes a host processor 202, at least one software application 106, an application interface 204, a hardware driver 206, and a host bus adapter (HBA) 208, which may also be called a network interface card (NIC). The host processor 202, application 106, host memory, application interface 204 and hardware driver 206 may be considered parts of the "host." The host processors 202A, 202B and the applications 106A, 106B in FIG. 2 do not have to perform TCP/IP protocol processing.

The special purpose host bus adapters 208A, 208B may perform protocol processing, which allows efficient high-speed communication across a TCP/IP Ethernet network 104 with minimal impact on host processor performance. The HBAs 208A, 208B may establish, maintain and tear down a plurality of VI connections over TCP connections. Several applications 106 in a host system 102 may share a single HBA 208, its hardware and its firmware functions. The HBAs 208A, 208B may encapsulate VI messages in standard TCP/IP data streams. The HBAs 208A, 208B may use standard TCP/IP protocols, such as routing, flow control, congestion control and retransmission.

The application interface 204 in FIG. 2 is an implementation of a standard VI interface appropriate to the host system 102. The host processor 202 communicates with the HBA 208 using the highly-efficient VI application program interface (API) 204. The HBA 208 processes VI commands.

The hardware driver 206 is an operating-system-specific device driver for interfacing with the host bus adapter 102 appropriate to the host system 102.

Figure 3:
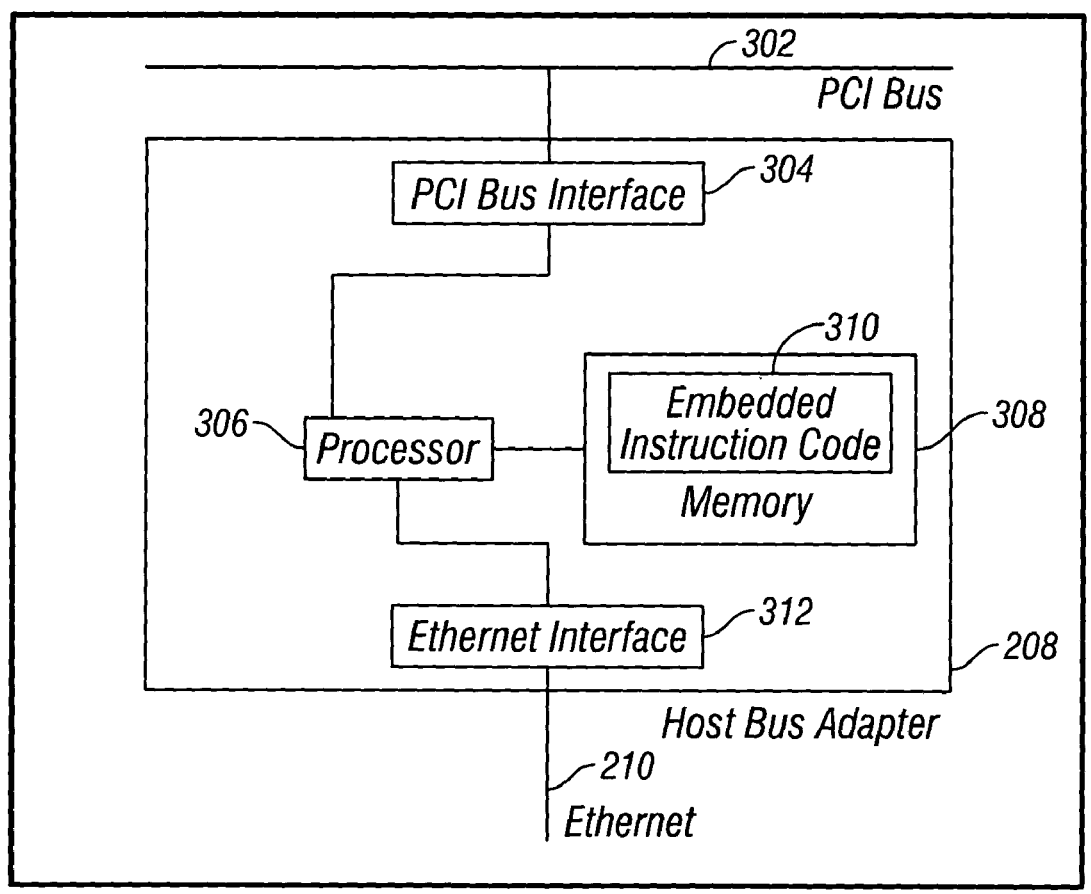
FIG. 3 illustrates a host bus adapter (HBA) in a host system of FIG. 2.

FIG. 3—HBA Hardware

FIG. 3 illustrates an HBA 208 in a host system of FIG. 2. The HBA 208 is coupled to an Ethernet connection 210 and a host bus 302. The HBA 208 may be an interface card that is installed onto a host system's I/O bus 302, which couples components in the host system 102. The I/O bus 302 may be a standard Peripheral Component Interface (PCI) bus. The use of the PCI bus is an implementation example and not critical to the present application. Other I/O technologies may be used.

The HBA 208 includes application specific integrated circuits (ASICs) with an interface 304 to the I/O bus 302, a processor 306, a local memory 308, an embedded firmware instruction code 310 and an interface 312 to an Ethernet network connection/port 210. The embedded firmware instruction code 310 may implement a mechanism for high-speed VI communication over standard TCP/IP on the Ethernet network 104, as described with respect to FIG. 4.

FIG. 4

Figure 4:
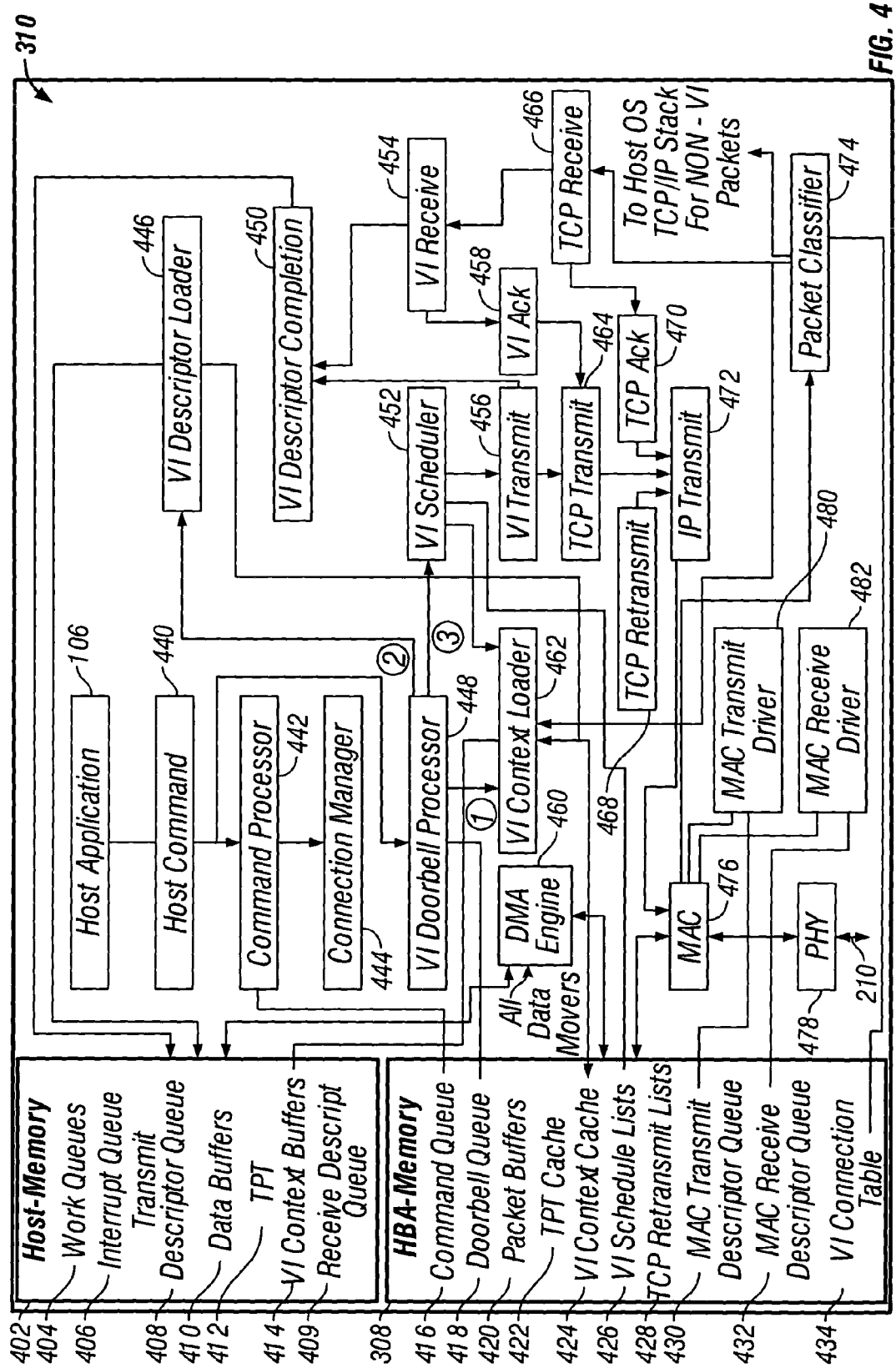
FIG. 4 illustrates a host memory, an HBA memory, a direct memory access (DMA) engine, a media access control (MAC) layer, a physical Ethernet network chip and wire (PHY), and a plurality of firmware modules, processes, functions, routines, tasks of the HBA embedded code in FIG. 3 for implementing VI over a transport protocol, such as TCP/IP.

FIG. 4 illustrates a host memory 402, an HBA memory 308, a direct memory access (DMA) engine 460, a media access control (MAC) layer 476, a physical Ethernet network chip and wire (PHY) 478, and a plurality of modules, processes, functions, routines, and tasks of the HBA embedded firmware code 310 in FIG. 3 for implementing VI over a transport protocol, such as TCP/IP. The firmware 310 in FIG. 4 may transfer special VI messages and all types of data from one application 106A to another application 106B.

The host memory 402 includes work queues 404, an interrupt queue 406, a transmit descriptor queue 408, a receive descriptor queue 409, data buffers 410, a memory address Translation and Protection Table (TPT) 412, and VI context buffers 414.

Each of the host data buffers 410 may store data associated with a particular host application or connection, i.e., application data or messages. The memory 402 may have a set of buffers associated with a set of connections.

The HBA memory 308 includes a command queue 416, a doorbell queue 418, packet buffers 420, a TPT cache 422, a VI context cache 424, VI schedule lists 426, TCP retransmit lists 428, a media access control (MAC) transmit descriptor queue 430, a MAC receive descriptor queue 432 and a VI connection table 434.

The DMA engine 460 receives commands from the processes and tasks of the HBA embedded code 310, such as a VI transmit task 456. The DMA engine 460 directly transfers data between the host memory 402 and HBA memory 308 over the PCI bus 302 in FIG. 3.

The MAC layer 476 in FIG. 4 is a lower data link layer that moves the data between the HBA memory 308 and the physical Ethernet network layer (PHY) 478, which may comprise a chip coupled to a wire. The MAC 476 may handle cyclic redundancy codes of data transferred over the network 104.

FIG. 4 also shows multiple processors, tasks and their sequences or calls, but some task sequences (described below with FIGS. 5 and 6) may not be shown in FIG. 4 due to spatial limitations. The embedded code 310 implements multiple interrelated tasks to process VI commands and TCP/IP streams and packets. The TCP/IP processing tasks have been offloaded from a host TCP/IP stack in conventional host systems.

The host application 106 sends commands 440 to the HBA by writing commands directly into the HBA command queue 416. The HBA command processor 442 receives host commands 440 from the HBA command queue 416, and starts processing the commands in the HBA command queue 416.

HBA Transmits Data

Figure 5A:
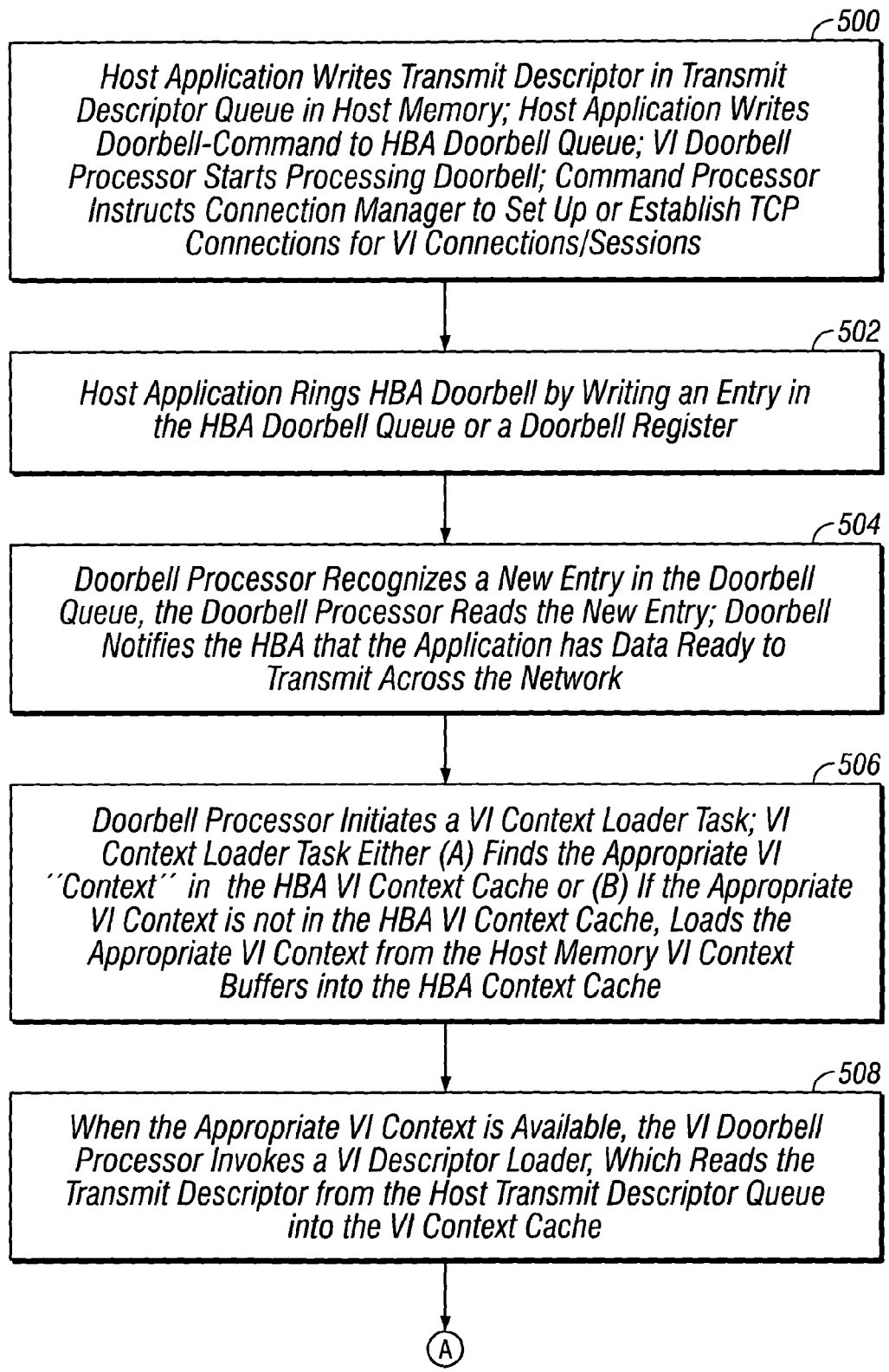
FIGS. 5A-5B illustrates a method of using some of the processors, modules, queues, buffers and data structures in FIG. 4 to transmit message data from a host application in FIG. 2 across the network to another host application.
Figure 5B:
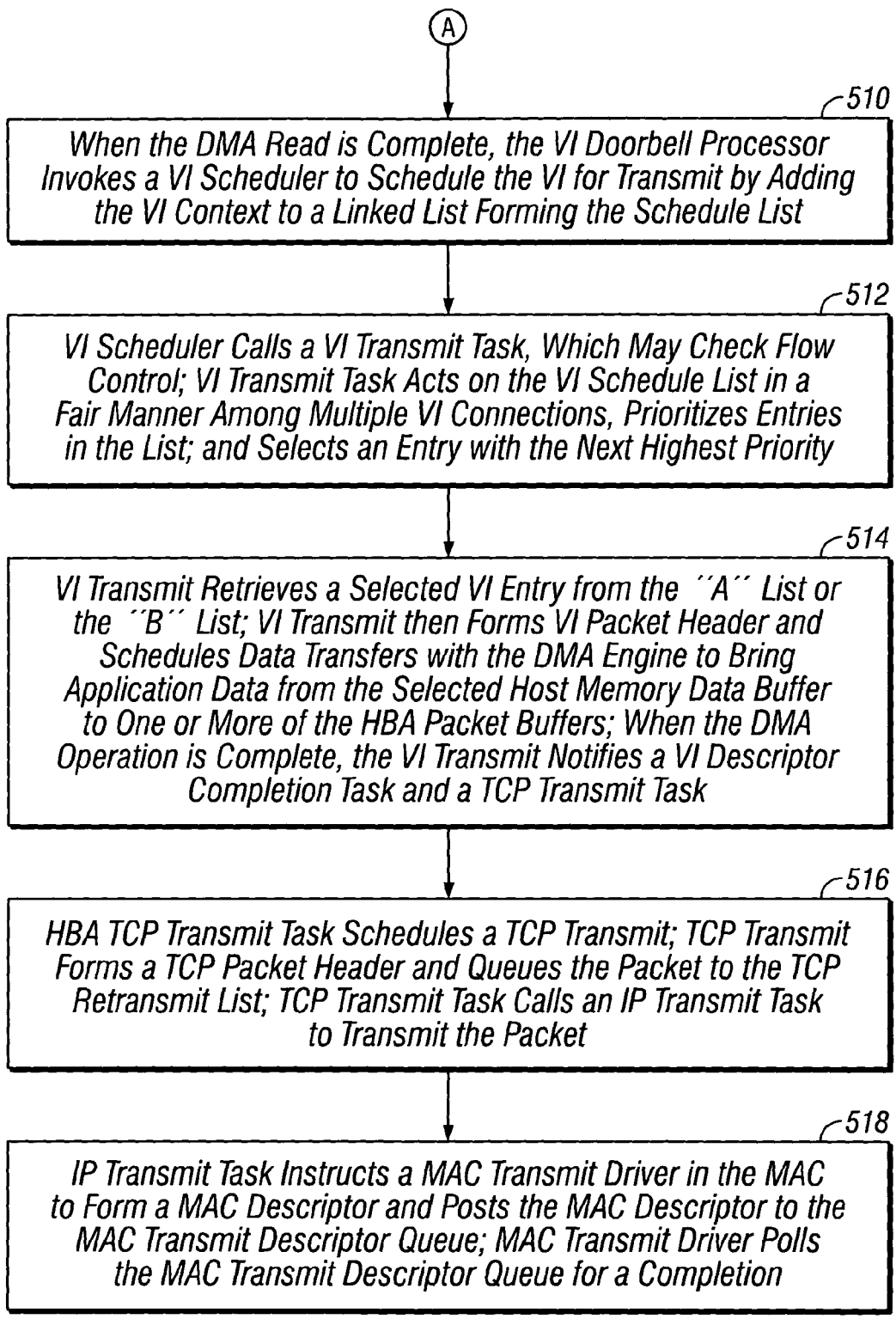

FIGS. 5A-5B illustrates a method of using some of the processors, modules, queues, buffers and data structures in FIG. 4 to transmit message data from a host application 106A (FIG. 2) across the network 104 to another host application 106B.

The host application 106A writes a transmit descriptor in a transmit descriptor queue 408 (FIG. 4) in host memory 402 in 500. A "transmit descriptor" is a list of one or more pointers that point to one or more host memory buffers 410 with data from a host application 106A to be transmitted across the network 104. The host application 106A writes a doorbell-command (doorbell) 440 to the HBA doorbell queue 418. The VI doorbell processor 448 starts processing the doorbell.

The command processor 442, in response to connection commands from the host application (VI user), instructs the connection manager 444 to set up or establish TCP connections for VI connections/sessions. The connection manager 444 also tears down TCP connections when a VI connection is closed.

The host application 106A "rings" an HBA doorbell (special type of command) in 502 by writing an entry in the HBA doorbell queue 418 (FIG. 4) or a doorbell register (not shown) via the PCI bus 302 in FIG. 3. The doorbell entry identifies the specific VI and the location of the new transmit descriptor.

A VI doorbell processor 448 may be a special command processor that periodically polls the doorbell queue 418. When the doorbell processor 448 recognizes a new entry in the doorbell queue 418 in 504, the doorbell processor 448 reads the new entry. The detected doorbell notifies the HBA 208 that the application 106A has data ready to transmit across the network 104.

The doorbell processor 448 initiates (schedules or calls) a VI context loader task 462 in 506. The VI context loader task 462 either (a) finds the appropriate VI "context" in the HBA VI context cache 424 or (b) if the appropriate VI context is not in the HBA VI context cache 424, loads the appropriate VI context from the host memory VI context buffers 414 into the HBA context cache 424. The latter operation may involve a DMA read operation by the DMA engine 460 over the PCI bus 302.

The "VI Context" refers to VI state information and the connection state information for each VI/TCP "connection" between two applications 106A, 106B. There may be 256 or more bytes of context. TCP context information may include: (a) a local IP address and port number; (b) a remote IP address and port number; and (c) a sequence number of the next TCP packet expected by the connection. The context information may also include a source IP address, a destination IP address, a source port number, and a destination port number (collectively called a "four-tuple"). The context information may also contain other additional information.

When the appropriate VI context is available or loaded in 506, the VI doorbell processor 448 invokes a VI descriptor loader 446, which reads (via the DMA engine 460) the transmit descriptor from the host transmit descriptor queue 408 into the VI context cache 424 in 508. The VI context cache 424 holds a current transmit descriptor that is being processed.

When the DMA read in 508 is complete, the VI doorbell processor 448 invokes a VI scheduler 452 to schedule the VI for transmit in 510 by adding the VI context to a linked list forming the schedule list 426. The VI schedule lists 426 allow the VI Transmit task 456 to balance service to multiple VI connections. The VI schedule lists 426 ensure that the embedded code 310 handles transmit and receives for multiple VIs fairly, such that a single VI connection does not consume all of the HBA resources.

The VI schedule lists 426 may include an "A" ordered list and a "B" ordered list. The "A" list may be a linked list of VI contexts that have new messages to send. The "B" list may be a linked list of VI contexts that had started to send messages but were suspended before they completed to allow other VIs to run. The VI scheduler 452 may use a dual round robin queue system by adding new entries to the end of the "A" list and adding suspended ("old") entries to the end of the "B" list. The VI Transmit task alternates service between the "A" and "B" lists. The VI Transmit task services each entry for a fixed period of time, or for a fixed amount of data then suspends that entry by putting it onto the end of the "B" list. By using this mechanism, VIs that are "heavy" users will naturally migrate to the "B" list, and the "A" list will remain relatively empty allowing "light" VI users to still get relatively low latency service.

The VI scheduler 452 calls a VI transmit task 456, which may check flow control. The VI transmit task 456 acts on the VI schedule list 426 in a fair manner among multiple VI connections, prioritizes entries in the list 426, and selects an entry with the next highest priority in 512. Alternatively, the VI scheduler 452 may select a VI for the VI transmit task 456 to handle.

The VI transmit 456 retrieves a selected VI entry from the "A" list or the "B" list, alternating between the lists when they both contain work. The VI transmit 456 then forms the VI packet header and schedules data transfers with the DMA engine 460 to bring application data from the selected host memory data buffer 410 to one or more of the HBA packet buffers 420 in 514. When the DMA operation is complete, the VI transmit 456 notifies a VI descriptor completion task 450 and a TCP transmit task 464.

The VI descriptor completion task 450 notifies the host memory 402 that the transmit descriptor is "complete" for VI by writing (via DMA engine 460) completion/status bits in the transmit descriptor in the host transmit descriptor queue 408. The host application 106A is notified that its data transmit request is complete. The host application 106A is not burdened with TCP processing.

The HBA TCP transmit task 464 schedules a TCP transmit. TCP transmit 464 forms a TCP packet header 704 (FIG. 7) and queues the packet to the TCP retransmit list 428 (also called a "sent list") in 516. The TCP transmit task 464 calls an IP transmit task 472.

The packet is not being put into this retransmit list 428 to be transmitted right now. The packet will be transmitted by calling the IP transmit task 472 directly, passing a reference to the packet. Rather, the purpose of putting the packet on this "retransmit"/"sent" list 428 is to have a copy of the packet in case some time in the future the packet needs to be retransmitted. It is similar to keeping a copy of the packet in a back pocket until the other end of the connection confirms that it received the packet.

To retransmit, a retransmit list 428 enables a TCP retransmit function 468 to retransmit a packet. The TCP transmit 464 includes a TCP protocol stack that performs TCP protocol processing, e.g. keep a number count of messages sent and processes acknowledgements (ACKs).

The IP transmit task 472 instructs a MAC transmit driver 480 in the MAC 476 to form a MAC descriptor (not the same as the transmit descriptor in 500 above) and posts the MAC descriptor to the MAC transmit descriptor queue 430 in 518.

The MAC transmit driver 480 polls the MAC transmit descriptor queue 430 for a completion, which is a transmission of a packet by the MAC 476 and the PHY 478 on a wire. The PHY 478 may include a chip that turns digital data bits into a serial stream of optical light pulses for transmission.

Packet Structure

Figure 7:
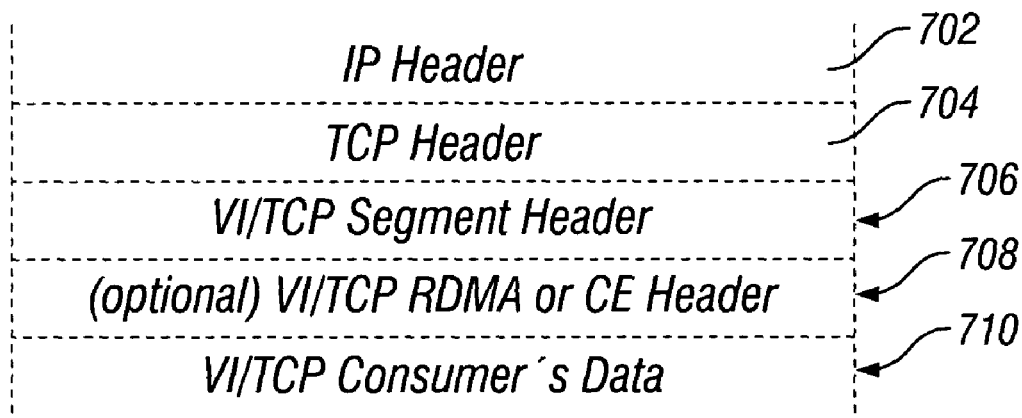
FIG. 7 illustrates a packet assembled by the HBA of FIG. 3.

FIG. 7 illustrates a VI/TCP packet 700 assembled by the HBA 208 of FIG. 3. The packet 700 includes an IP header 702, a TCP header 704, a VI header 706, such as a VI/TCP Segment Header, an optional VI/TCP RDMA or connection establishment (CE) header 708, and VI/TCP consumer application data 710. A "VI packet" includes a VI packet header 706 formed by the VI transmit task 456 plus VI data in the consumer data part 710. The "VI packet" is encapsulated in a TCP packet 700 as shown. An example of a VI/TCP packet is further described in the IETF Memo.

Preparing to Receive Packets

Figure 6A:
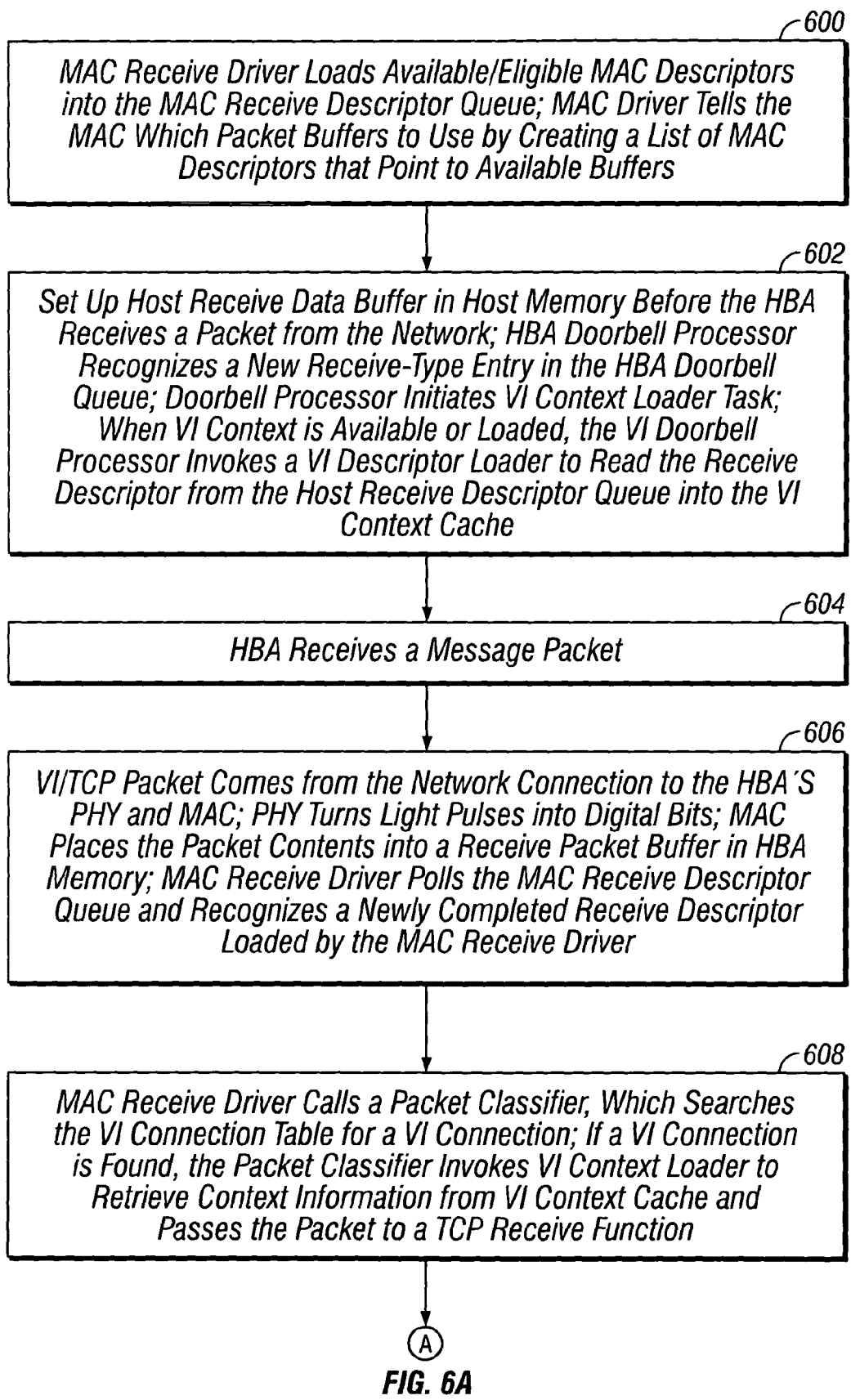
FIGS. 6A-6B illustrate a method of preparing to receive a packet and processing a received packet.
Figure 6B:
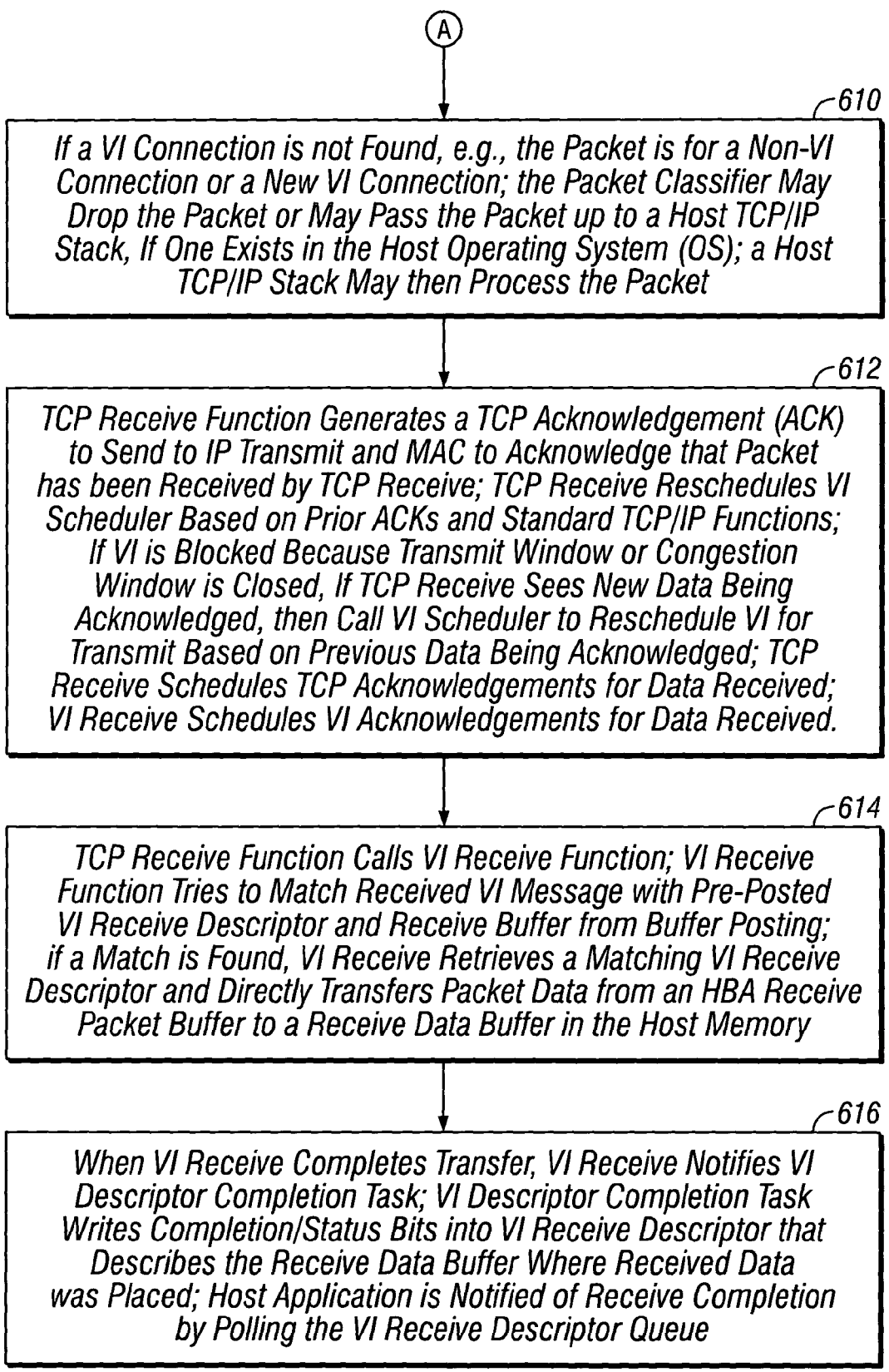

FIGS. 6A-6B illustrate a method of preparing to receive a packet and processing a received packet. When the HBA initializes/starts up running, the MAC receive driver 482 loads available/eligible MAC descriptors into the MAC receive descriptor queue 432 in 600. The MAC descriptors point to available buffers in the HBA-Memory packet buffers 420. The packet buffers are a big pool of available buffer space that may hold packets as they come into the HBA. The MAC driver 482 tells the MAC 476 which packet buffers to use by creating a list of MAC descriptors that point to available buffers. When the MAC 476 receives a packet, it copies the packet into the packet buffer pointed to by the first MAC descriptor, marks that descriptor as "done," then moves to the next descriptor in the list for the next packet that comes in. As the HBA runs, the MAC Receive driver 482 strives to keep the MAC Receive Descriptor Queue 432 from going empty by posting more eligible packet buffers (via MAC descriptors) into the Receive Descriptor Queue 432 whenever receive packet buffers are consumed by the MAC 476.

The receive packet buffers 420 are described above and are a sort of "staging" area for the data between the MAC 476 and the host data buffers 410. They are setup and handled independently of the host data buffers.

A host receive data buffer 410 in host memory 402 may be set up before the HBA 208 receives a packet from the network 104. This may be called a "pre-post buffer" or "buffer posting" in 602 and may have operations similar to the first five "transmit" operations 500-508 described above.

For example, a host application 106 that expects to receive data may write one or more receive descriptors to the host receive descriptor queue 409 and "ring" a receive-type doorbell in the HBA doorbell queue 418 via the PCI bus 302 in FIG. 3. The doorbell entry identifies the specific VI and which transmit/receive descriptor has been rung before.

The HBA doorbell processor 448 recognizes a new receive-type entry in the HBA doorbell queue 418. The doorbell processor 448 initiates the VI context loader task 462. When VI context is available or loaded, the VI doorbell processor 448 invokes a VI descriptor loader 446 to read (by DMA engine 460) the receive descriptor from the host receive descriptor queue 409 into the VI context cache 424. There may always be packet buffers ready to receive packets, even if the host has not posted any VI descriptors and data buffers. The reason is the MAC 476 may not know one packet from another. Thus, packet buffers are available for the MAC 476 to store packets. Then the firmware tasks look at the packets and decide what to do.

There may be an indeterminate time duration between completion of the buffer posting in 602 and the HBA's receipt of a message packet 700 in 604. Many events may happen before the HBA 208 receives a message packet 700. The HBA 208 may never receive a message packet. If the HBA PHY 478 receives a VI message packet before the host application 106 sets up a VI receive buffer in the host memory 402, the packet classifier 474 may drop the VI message packet. If the packet is identified as a VI message packet, then the classifier may not pass it to the host TCP/IP stack. If the packet cannot be identified as a VI message packet, then the packet may be passed to the host TCP/IP stack. This function may be independent of whether or not the VI has a pre-posted receive buffer.

HBA Receives a Packet

A VI/TCP packet 700 (FIG. 7) comes from the network connection 210 (FIG. 3) to the HBA's PHY 478 and MAC 476 in 604. The PHY 478 may turn light pulses into digital bits.

The MAC 476 places the packet contents into a receive packet buffer 420 in the HBA memory 308. The MAC receive driver 482 polls the MAC receive descriptor queue 432 in 606 and recognizes a newly completed receive descriptor loaded by the MAC receive driver 482 in 600. The empty packet receive buffer was previously queued to the MAC Receive Descriptor Queue 432 by the MAC receive driver 482.

The MAC Receive Driver 482 calls a packet classifier 474 in 608, which searches the VI connection table 434 for a VI connection. The identification is done by the connection 4-touple (source address, source port, destination address, destination port) contained in the TCP/IP header. If a VI connection is found, the packet classifier 474 invokes the VI context loader 462 to retrieve context information from the VI context cache 424 and passes the packet to a TCP receive function 466.

If a VI connection is not found in 610, e.g., the packet is for a non-VI connection or a new VI connection, the packet classifier 474 may drop the packet or may pass the packet up to a host TCP/IP stack, if one exists in the host operating system (OS). A host TCP/IP stack may then process the packet.

Since a VI message is encapsulated in a TCP packet 700, the TCP receive function 466 may perform TCP protocol processing. For example, the TCP receive function 466 generates a TCP acknowledgement (ACK) 470 to send to the IP transmit 472 and MAC 476 in 612 to acknowledge that a packet has been received by the TCP receive 466. The TCP receive 466 may reschedule the VI scheduler 452 based on prior ACKs and standard TCP/IP functions. If a VI is blocked because the transmit window or congestion window is closed, if the TCP Receive 466 sees new data being acknowledged, then the VI scheduler 452 will be called to reschedule the VI for transmit based on previous data being acknowledged. The TCP receive 466 may schedule TCP acknowledgements 470 for data received. The VI Receive 454 may schedule VI acknowledgements (ACKs) 458 for data received. VI ACKs are different than TCP ACKs.

The TCP receive function 466 calls the VI receive function 454 in 614. The VI receive function 454 tries to match the received VI message with a pre-posted VI receive descriptor and receive buffer from the buffer posting in 602. If a match is found, the VI receive 454 retrieves a matching VI receive descriptor and directly transfers (via the DMA engine 460) packet data 710 (FIG. 7) from an HBA receive packet buffer 420 to a receive data buffer 410 in the host memory 402.

When the VI receive 454 completes the transfer, the VI receive 454 notifies the VI descriptor completion task 450. The VI descriptor completion task 450 uses the DMA engine 460 to write completion/status bits into the VI receive descriptor that describes the receive data buffer 410 where the received data was placed. The VI descriptor completion task 450 may optionally set an interrupt for the host operating system or application 106. The host application 106 is notified of the receive completion in 616 by polling the VI receive descriptor queue 409 or by the optional interrupt.

The VI receive task 454 also sets VI acknowledge (ACK) bits 458 to be sent in a VI header 706 (FIG. 7) of a VI packet 700. A VI packet with VI ACK bits 458 is passed to the TCP transmit 464, then the IP transmit 472. The MAC 476 sends a packet 700 (FIG. 7) with VI ACK bits to the HBA and application that sent the first VI packet.

Most packets sent by an HBA 208 may include acknowledgements in the packet headers that notify other host systems 102 of the HBA's packet processing progress. The HBA 208 may send two types of VI packets with acknowledgements to other host systems: a VI packet 700 (FIG. 7) with acknowledgement bits in the VI header 706 and payload data 710; and a VI packet 700 with acknowledgement bits in the header 706 without payload data (a "naked ACK"). The receive operation is then complete.

The hardware, software and firmware in FIG. 4 may handle multiple VI connections, VI packet transfers and protocol processing tasks simultaneously.

A number of embodiments have been described. Nevertheless, it will be understood that various modifications may be made without departing from the spirit and scope of the application. For example, the description above assumes an underlying TCP/IP network, but other types of protocols, standards, packet types and networks may be used. For example, the systems and methods described herein may be applied to Simple Computer Telephony Protocol (SCTP), Virtual Interface (VI) over TCP/IP, Fibre Channel or iSCSI. For example, the description assumes the HBA is connected to the host via a PCI bus and contains a PCI Bus Interface, but other types of connection to the host may be used such as direct connection to the system memory bus, other IO bus technologies (PCI-X, S-Bus, etc), or other non-bus IO connection technologies. Accordingly, other embodiments are within the scope of the following claims.

What is claimed is:

1. A method of preparing application data for transmission from a host application across a TCP network, the method comprising:

writing a transmit descriptor in a host memory queue, said transmit descriptor indicating the application data to be transmitted by the host application;

establishing a Transmission Control Protocol (TCP) connection for a Virtual Interface (VI) connection;

notifying a host bus adapter of the transmit descriptor in the host memory queue, said host bus adapter coupled to a host executing said host application, said host including said host memory queue;

initiating a VI context loading task by finding appropriate VI context information from a host bus adapter VI context cache or loading appropriate VI context information from host memory VI context buffers, the VI context information including state information for the TCP and VI connections;

reading the transmit descriptor from the host memory queue and writing into a host bus adapter VI context cache after the VI context information is loaded;

scheduling a Virtual Interface packet for transmission in a TCP packet in response to transferring the application data from a host memory buffer to a host bus adapter packet buffer in accordance with the transmit descriptor; and transmitting the application data in the TCP packet from said host bus adapter across the TCP network.

2. The method of claim 1, further comprising storing said application data in one or more host memory buffers in said host, wherein said host bus adapter configured to have access to said one or more host memory buffers.

3. The method of claim 1, wherein the transmit descriptor includes pointers to one or more host memory buffers that store the application data for transmission.

4. The method of claim 1, further comprising sending a command to a host bus adapter command processor to establish the Transmission Control Protocol (TCP) connection for the Virtual Interface (VI) connection.

5. The method of claim 1, further comprising polling a host bus adapter doorbell queue for a new entry indicating the application data is ready for transmission.

6. The method of claim 1, further comprising loading the VI context state information from a host memory Virtual Interface context cache to the host bus adapter VI context cache.

7. The method of claim 1, further comprising transferring the application data from a host memory to a host bus adapter memory via direct memory access.

8. The method of claim 1, further comprising preparing a plurality of Virtual Interface packets for transmission for a plurality of Virtual Interface connections corresponding to a plurality of TCP connections.

9. The method of claim 1, further comprising using a round robin method to schedule a plurality of Virtual Interface packets for transmission for a plurality of Virtual Interface connections corresponding to a plurality of TCP connections.

10. The method of claim 1, further comprising notifying the host application that the transmit descriptor has been processed.

11. The method of claim 1, further comprising scheduling the TCP packet for transmission.

12. The method of claim 1, further comprising retransmitting the TCP packet.

13. The method of claim 1, further comprising performing TCP protocol processing in the host bus adapter.

14. The method of claim 1, further comprising forming a media access control (MAC) descriptor for transmitting the application data over a MAC layer.

15. The method of claim 14, further comprising posting the MAC descriptor in a MAC transmit descriptor queue.

16. The method of claim 1, wherein the transmitted TCP packet comprises a TCP header, an Internet Protocol header, a Virtual Interface header and application data.

17. A method of preparing to receive a packet transmitted over a TCP network into a host, the method comprising:
  loading eligible MAC descriptors into a media access control (MAC) receive descriptor queue in a host bus adapter coupled to the host, the MAC descriptors pointing to available packet receive buffers in a host bus adapter memory;
  writing a receive descriptor to a host receive descriptor queue in the host;
  notifying the host bus adapter of the receive descriptor;
  loading Virtual Interface context information from a host memory Virtual Interface context cache into a host bus adapter Virtual Interface context cache;
  reading the receive descriptor from the host receive descriptor queue and writing into the host bus adapter Virtual Interface context cache;
  configuring a receive buffer in the host bus adapter memory for receiving the packet in accordance with the receive descriptor; and
  setting up a host receive buffer in the host for receiving the packet from the receive buffer in the host bus adapter memory,
  wherein the packet may be dropped if received prior to setting up the host receive buffer.

18. A method of processing a received packet from a TCP network in a host, the method comprising:
  receiving a packet at a host bus adapter coupled to the host from a physical layer and a media access control (MAC) layer, the packet including a Virtual Interface (VI) header that identifies a VI connection;
  notifying a host application of the received packet;
  dropping the received packet if the host application has not yet set up a VI receive buffer, otherwise storing the received packet in a pre-posted receive packet buffer in a host bus adapter memory;
  searching a Virtual Interface (VI) connection table in the host bus adapter memory for the VI connection identified by the VI header of the received packet;
  if the VI connection is found in the VI connection table, retrieving VI context information from a VI context cache and passing the received packet to a TCP receive function; and
  if the VI connection is not found in the VI connection table, performing TCP processing on the received packet in a host TCP/IP stack,
  wherein the TCP receive function comprises a VI receive function configured for retrieving a pre-posted VI receive descriptor associated with the received packet, and transferring the received packet from the pre-posted receive packet buffer in the host bust adapter memory to a receive data buffer in a host memory in accordance with the retrieved pre-posted VI receive descriptor.

19. The method of claim 18, further comprising writing completion bits into the VI receive descriptor that describes the receive data buffer in the host memory where the received packet was placed.

20. The method of claim 18, further comprising setting an interrupt to a host processor after the packet is received in the host memory.

21. A host bus adapter coupled to a host for receiving packets over a TCP network, the host bus adapter comprising:
  a first processor configured to process commands;
  a Virtual Interface (VI) connection manager configured to establish VI connections corresponding to Transmission Control Protocol (TCP) connections;
  a second processor configured to process doorbells;
  a command queue configured to store commands from the host;
  a doorbell queue configured to store doorbells;
  a VI connection table; and
  packet buffers configured to store VI packets,
  wherein the host bus adapter is configured to determine whether a packet received at a physical layer of the host bus adapter is a VI packet and if so, whether to drop or store the received packet depending on whether a host application has set up a VI receive buffer in the host.

22. The host bus adapter of claim 21, further comprising a Transmission Control Protocol/Internet Protocol (TCP/IP) stack.

23. The host bus adapter of claim 21, further comprising a VI context cache configured to provide connection state information for the VI connections.

24. The host bus adapter of claim 21, wherein each of the VI packets comprises a Transmission Control Protocol header, an Internet Protocol header and a VI header.

* * * * *